Patented May 23, 1944

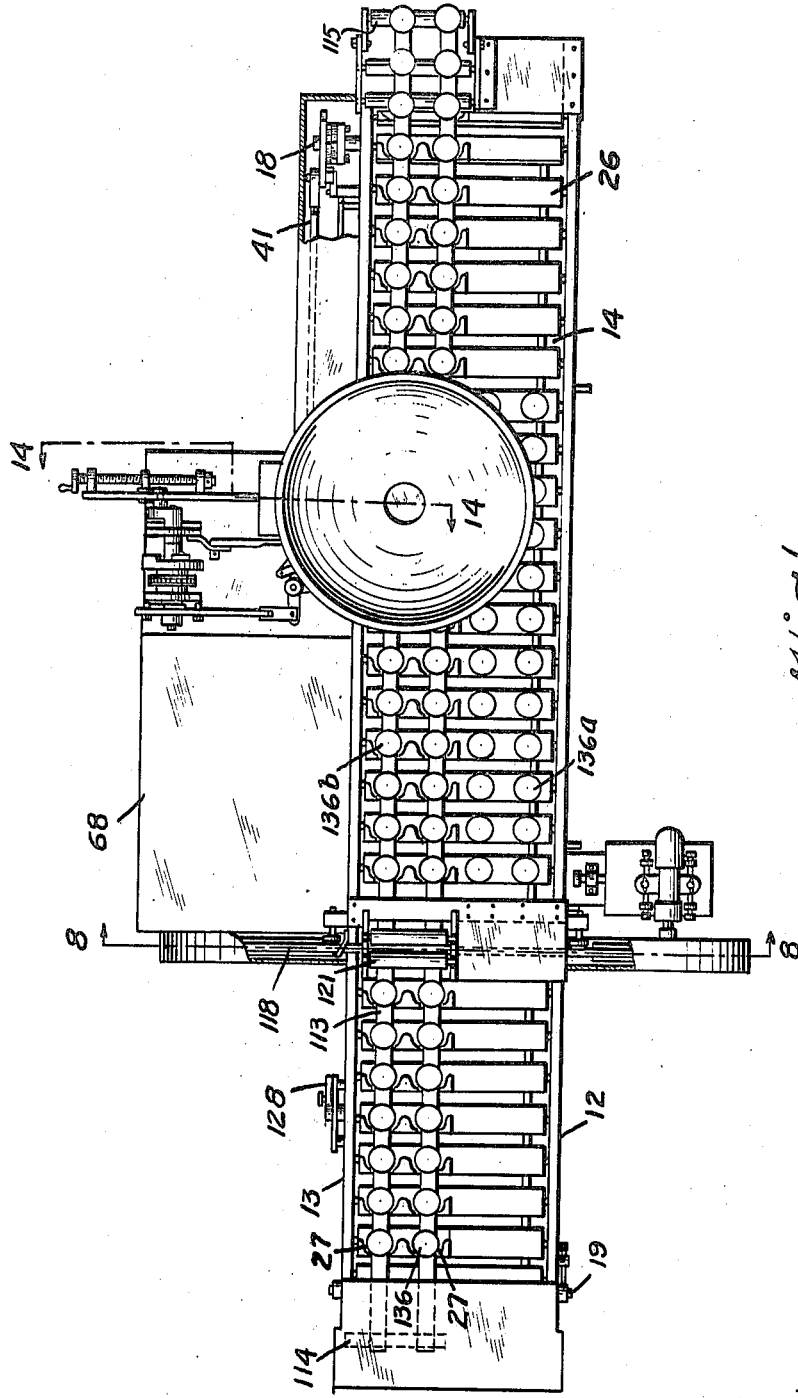

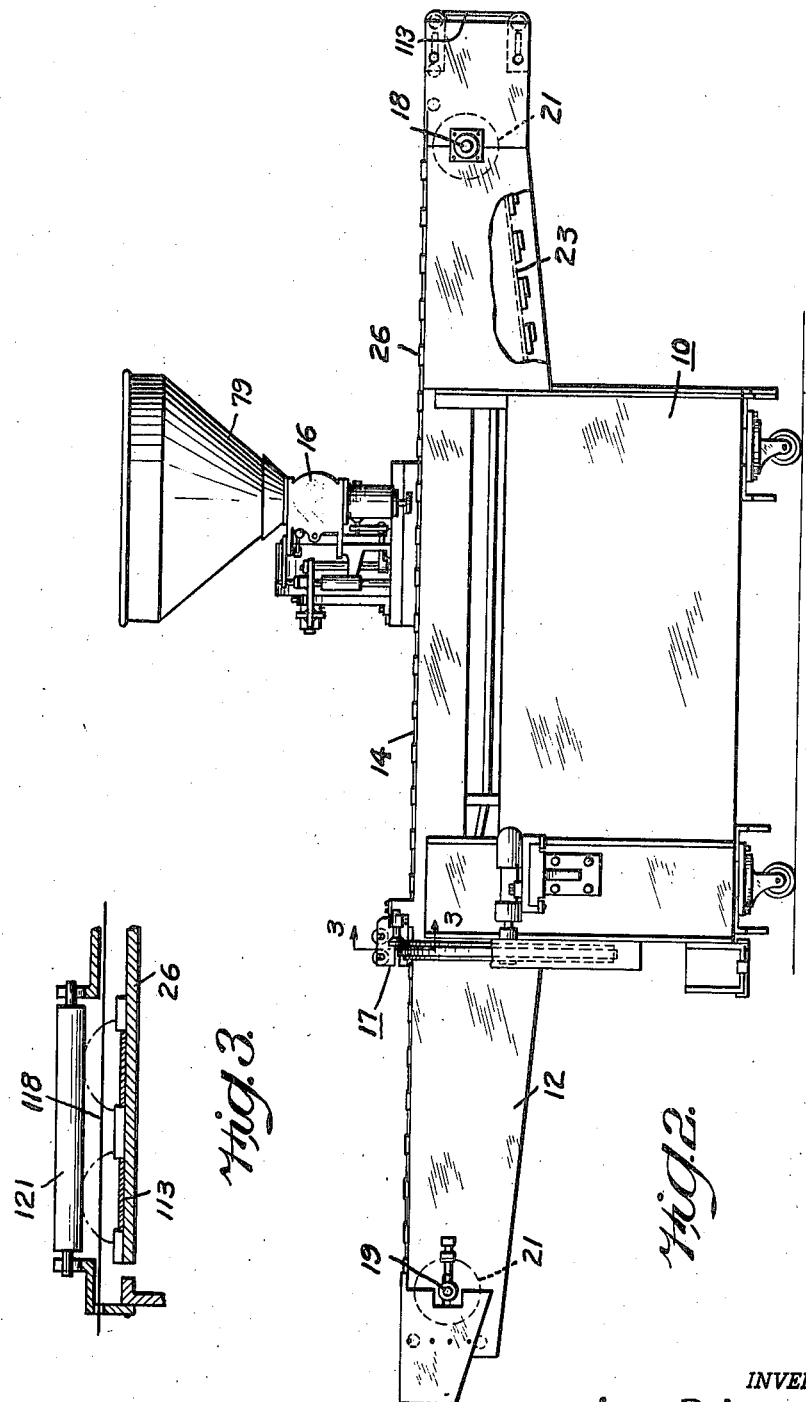

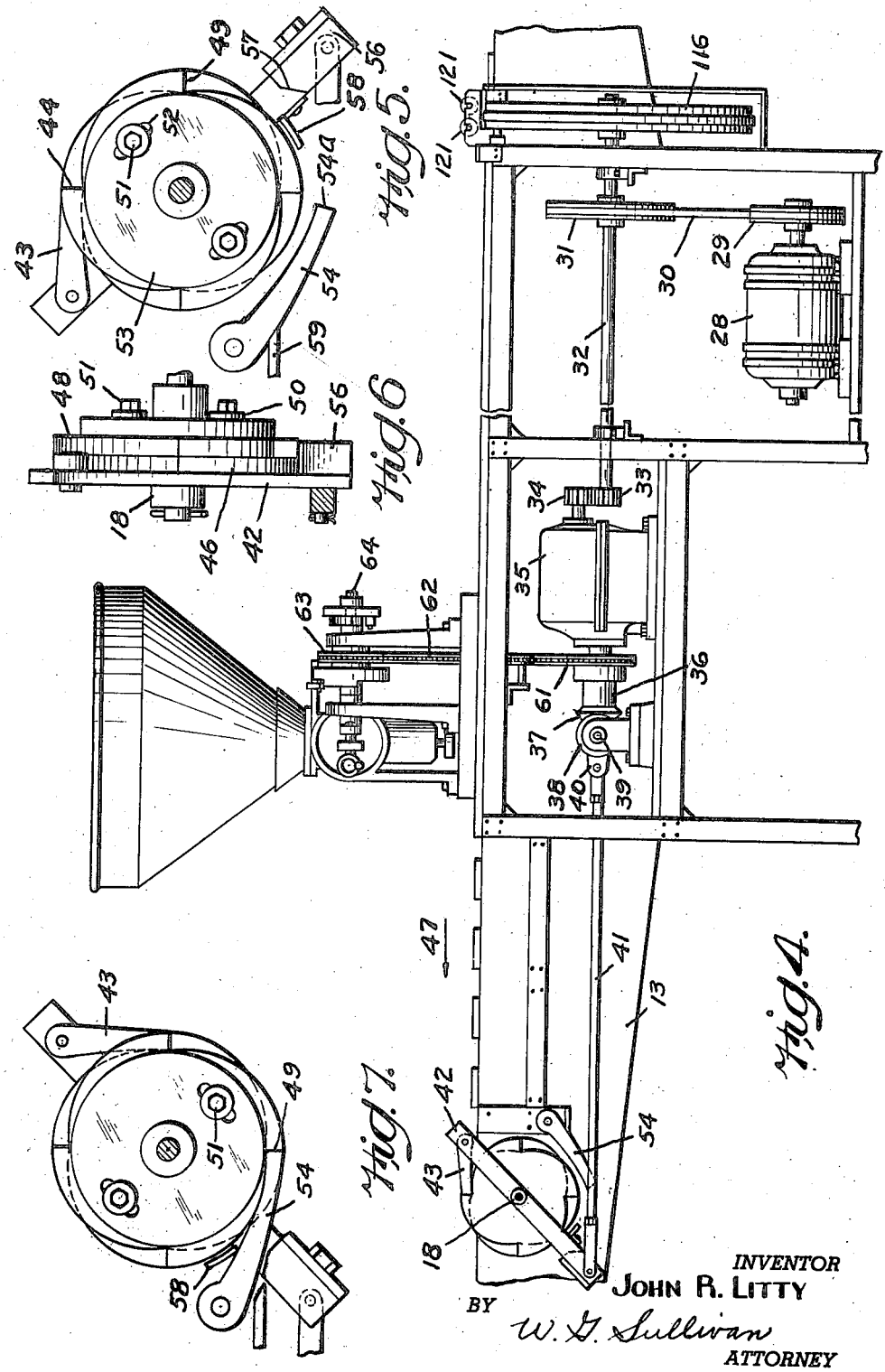

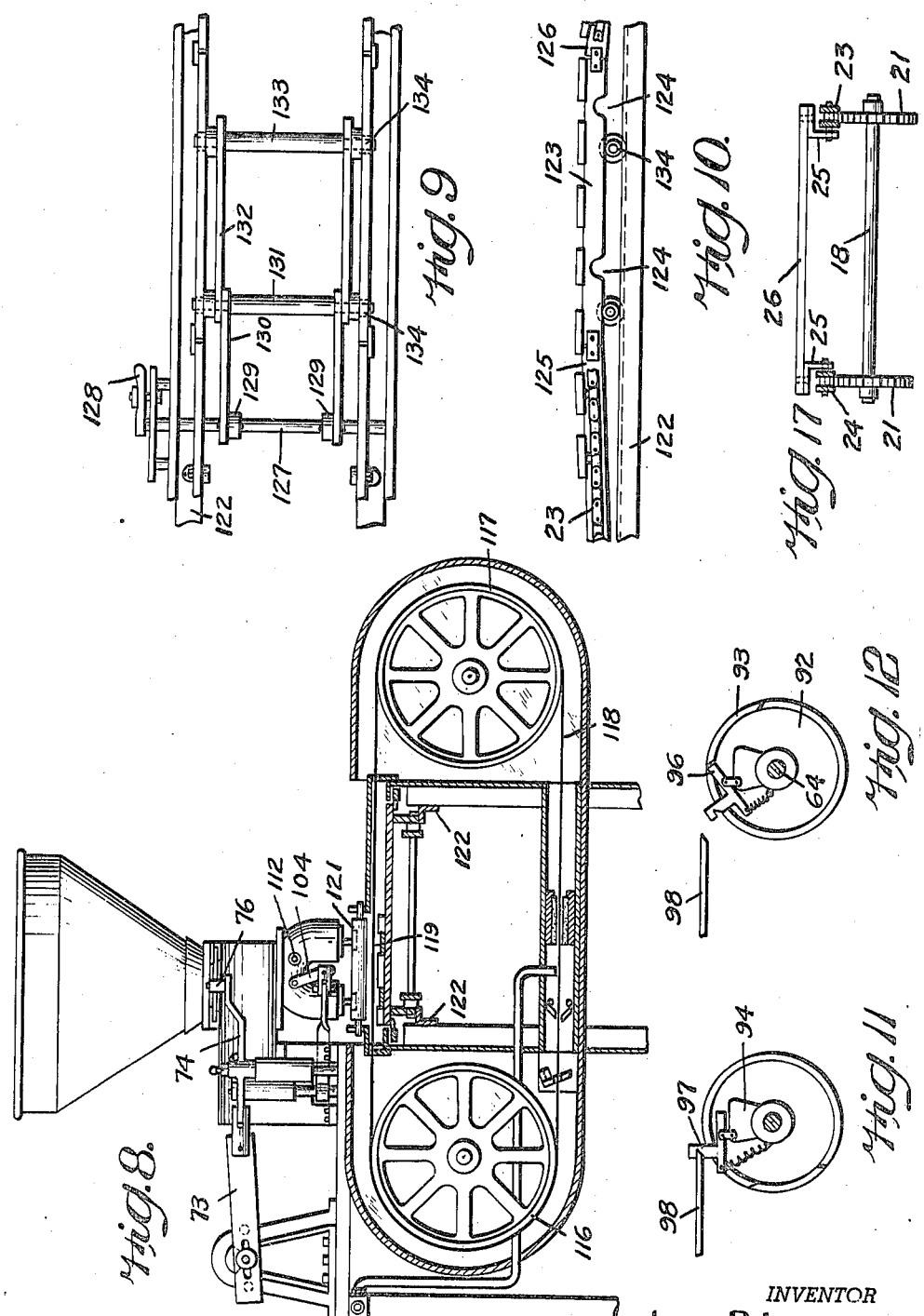

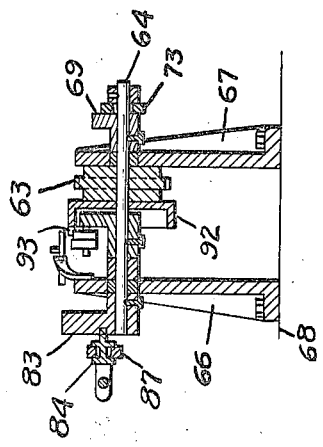
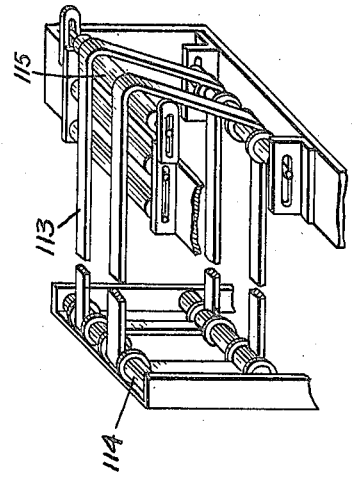
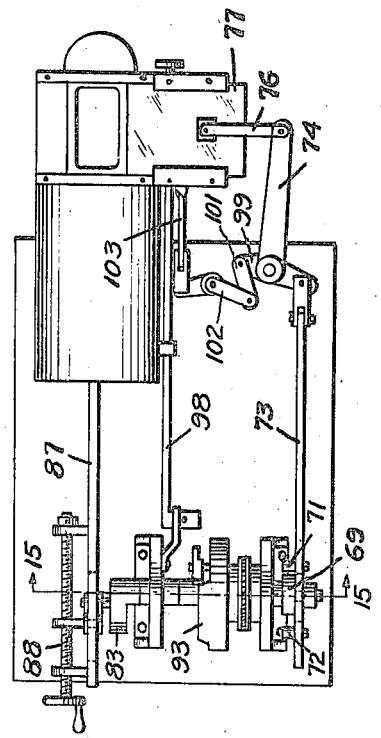
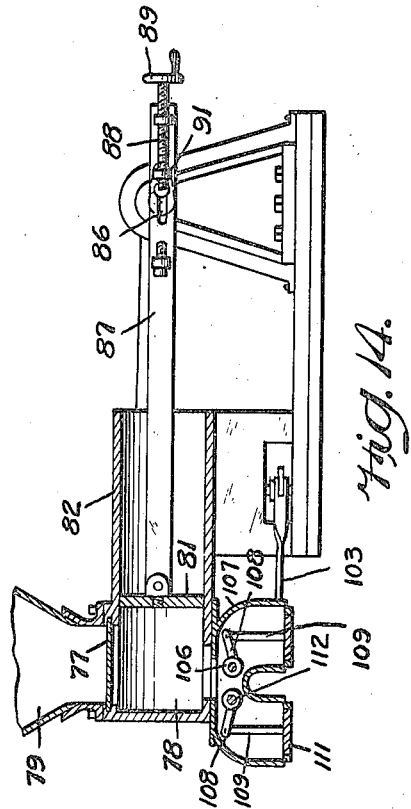

2,349,579

UNITED STATES PATENT OFFICE 2,349,579

APPARATUS FOR COATING ARTICLES

John R. Litty, Philadelphia, Pa.

Application December 11, 1940, Serial No. 369,541

1 Claim. (Cl. 91—3)

This invention relates to apparatus for rapidly applying predetermined amounts of viscous coating material, such as icing, to baked articles or the like, and more particularly to improved automatic means for applying said material in timed-relation to intermittent movement of a conveyor carrying said articles.

Today, there is an increasing demand in the baked goods industry for automatic machinery which will insure both uniformity of product and rapid production with a minimum of manual assistance.

I have devised a machine which will automatically and rapidly apply icing or the like in predetermined amounts to small round sandwiches, turnovers or similar baked articles, and which will apply said icing either to the top surface of such article, or will effect splitting of a two layer article and apply the icing to one of said layers.

It is a primary object of my invention to provide apparatus for automatically and rapidly applying a coating of viscous material to articles.

Another object of my invention is to provide apparatus for intermittently conveying articles to be coated to a depositing machine, and wherein the conveying apparatus and depositing machine are operable in timed-relation.

A further object of my invention is to provide apparatus for substantially evenly splitting an article into two layers, and subsequently depositing coating material on one of said layers as part of a continuous process.

According to the invention, articles to be coated to form sandwiches, turnovers and the like, are placed on an endless conveyor and carried beneath a machine for depositing icing or a similar coating. The depositing machine and the conveyor are operable in timed-relation, whereby conveyor movement will be interrupted for a sufficient period to deposit a predetermined amount of the coating on the article. Subsequently, the coated articles are conveyed to a wrapping machine or wrapping table. The process is continuous and preferably two or more articles are coated concurrently.

In the event that it is desired to dispose a coating between the top and lower layer of a sandwich, two layers of the sandwich material are unitarily formed, and these layers are substantially evenly split during travel on the conveyor towards the depositing machine. An operator then separates the top layer from the bottom layer and disposes the top layer transversely adjacent the bottom layer on the conveyor. After the coating has been applied, the operator places the top layer on the bottom layer prior to delivery of the completed sandwich to the wrapping table or wrapping machine. The process is relatively rapid and requires a minimum of manual operation. In coating a one layer article, only one operator is required to place the articles on the conveyor, and with dual depositing valves, the apparatus may be operated at a speed to produce one hundred and twenty coated articles per minute. When it is desired to place a coating between the layers of a two layer article, an additional operator is required to separate the layers prior to the coating operation and assemble the layers after the coating has been applied.

The drawings illustrate an embodiment of my invention and the views therein are as follows:

Figure 1 is a top plan view of apparatus embodying my invention,

Figure 2 is a front elevational view of the apparatus of Figure 1,

Figure 3 is a fragmentary sectional view taken along the line 3—3 of Figure 2,

Figure 4 is a rear elevational view of the apparatus of Figures 1 and 2 with end portions broken away, Figure 5 is an enlarged front detail view of conveyor operating means shown in Figure 4 with the operating means in position to initiate conveyor movement, Figure 6 is an end elevational view of the operating means illustrated in Figure 5, Figure 7 is a view similar to Figure 5, but with the operating means shown at the completion of conveyor movement, Figure 8 is a transverse sectional view taken along the line 8—8 of Figure 1, Figure 9 is a fragmentary plan view of the conveyor elevating means with the conveyor slats removed for clearness of illustration, Figure 10 is a front elevational view of the elevating means shown in Figure 9, Figures 11 and 12 are elevational views of a clutch device I may employ with the clutch device in engaged and disengaged position respectively, Figure 13 is an enlarged plan view of the depositing means with the hopper removed for clearness of illustration, Figure 14 is a sectional view taken along line 14—14 of Figure 1, Figure 15 is a sectional view taken along line 15—15 of Figure 13, Figure 16 is a broken perspective view illustrating article positioning means I may employ, and Figure 17 is an end elevational view showing the manner of mounting the conveyor slats.

Referring now to the drawings, and particularly to Figures 1 and 2, I provide a generally rectangular frame 10 which supports longitudinally extending and transversely spaced plate members 12 and 13. Plate members 12 and 13 have an endless slot type conveyor 14 mounted therebetween. Also supported by frame 10 is a depositing machine 16 adapted to periodically deposit icing or a similar coating of viscous material in timed-relation to interruption of movement of conveyor 14. I have indicated generally at 17 an arrangement for splitting an article into two layers when it is desired to form a sandwich or the like. It is understood that the splitting arrangement 17 may be omitted, or rendered inoperative, when the apparatus is employed to coat the top surface of a one layer article.

The conveyor construction will now be described, and is best illustrated in Figures 1, 2 and 17. The longitudinally extending plate members 12 and 13 rotatably support shafts 18 and 19 at opposite ends of said members. Fixed to each of the shafts 18 and 19 are a pair of transversely spaced sprocket wheels 21 which engage endless link chains 23 and 24. At spaced points, the chains have transversely aligned brackets 25 secured thereto, the brackets 25 forming a mounting for slats 26. The particular manner of securing the slats 26 to the chains 23 and 24 constitutes no particular part of my invention, and in the present instance, I have riveted the slats to brackets 25. The number and spacing of the slats 26 will be dependent upon the output desired in a given interval and the machine illustrated has a capacity of one hundred and twenty coated articles per minute. Secured to the top surface of slats 26 are transversely aligned arcuate blocks forming generally U-shaped guide pockets 27 substantially conforming to the shape of the article to be coated. Any desired number of guide pockets may be provided, and in the present instance, I have provided two transversely aligned guide pockets on each slat. The conveyor is intermittently moved, and has a dwell period permitting a predetermined amount of coating to be deposited on articles disposed beneath the depositing machine 16.

The manner of intermittently moving the conveyor will now be described, and is best illustrated in Figures 4 to 7 inclusive. A constant speed electric motor 28 has a pulley 29 secured to the shaft thereof which, through a belt 30, drives a pulley 31 fixed to a shaft 32. A pinion 33 on shaft 32 meshes with pinion 34 and through suitable reduction gears encased in a housing 35 drives a shaft 36. Shaft 36 has a bevel gear 37 at the out-board end thereof, which meshes with a cooperating bevel gear 38 fixed to a transversely extending shaft 39. An eccentric arm 40 secured to shaft 39 imparts oscillating movement to a rod 41, the opposite end of rod 41 being pivotally connected to one end of a bar 42, whereby oscillating movement will be imparted to bar 42. Bar 42 is rotatably mounted on shaft 18 and the upper end of bar 42 is provided with a dog 43 adapted to engage teeth 44 of a ratchet wheel 46. Ratchet wheel 46 is fixed to shaft 18, and it will now be understood that oscillating movement imparted to bar 42 as described will cause dog 43 to drivingly engage ratchet wheel 46, and rotate the ratchet wheel a predetermined distance in a counter-clockwise direction (as viewed in Figure 4) at each revolution of eccentric arm 40. Sprocket wheels 21 fixed to shaft 18 will be correspondingly rotated and will correspondingly move the conveyor a predetermined distance in the direction of arrow 47. During the retractive or clockwise movement of bar 42, conveyor movement will be interrupted or a dwell period will be provided for depositing coating material on articles disposed beneath the depositing machine 16.

Due to the speed at which the conveyor is moved and the necessity for accurately positioning the articles beneath the depositing machine, I have provided the following arrangement to prevent over-travel at the termination of the driving or counter-clockwise movement of bar 42. A second ratchet wheel 48, similar to ratchet wheel 46 but having the teeth 49 thereof oppositely disposed, abuts ratchet wheel 46 and is adjustably secured thereto by bolts 51 projected through slots 52 in an adjustment plate 53, the bolts 51 also projecting through corresponding slots provided in ratchet wheel 48, and threadedly engaging ratchet wheel 46. Washers 50 are preferably provided to insure a tight clamping action, and it will now be understood that by loosening bolts 51, the ratchet wheels may be relatively moved to alter the spacing between teeth 44 and 49. A second dog 54 is pivotally mounted on plate member 13 and is adapted to engage teeth 49 of ratchet wheel 48 at the termination of the driving stroke of bar 42, whereby further forward movement or over-travel of the conveyor will be prevented.

The manner of operating dog 54 will now be described. Secured to the lower end of bar 42 is a laterally extending lift element 56 having a beveled face 57 adapted to engage end 54a of dog 54, and relatively abruptly move end 54a into engagement with teeth 49 of ratchet wheel 48 as illustrated in Figure 7, whereby further forward movement of the ratchet wheels and the conveyor will be stopped. Dog 54 is adapted to be moved into engagement with teeth 49 substantially at the time dog 43 completes its driving stroke and starts its retractive stroke. The adjustment arrangement heretofore described permits of arcuate timing of the movement of dogs 43 and 54, and at the same time provides an adjustment compensating for wear of chains 23 and 24 which otherwise would cause a slight lost motion resulting in inaccurate positioning of articles on the conveyor beneath the depositing machine. In order to insure that dog 54 will drop to a disengaged position, an arcuate lateral extension 58 is provided on bar 42 which is adapted to engage the top surface of dog 54 on the retractive stroke of bar 42 and force dog 54 to the position illustrated in Figure 5. A stop 59 limits downward movement of dog 54.

The construction and operation of the depositing machine will now be described, and is best illustrated in Figures 4, 13, 14 and 15. Referring now to Figures 4 and 15, shaft 36 extending from the gear reduction housing 35 has a sprocket wheel 61 secured thereto which, through a chain 62, drives a second sprocket wheel 63 rotatable on a shaft 64. Shaft 64 is rotatably mounted in spaced brackets 66 and 67, the brackets being secured to a table 68 extending laterally from longitudinal member 13. Secured to shaft 64 is an eccentric cam element 69 adapted to engage pins 71 and 72 secured to an arm 73, whereby an intermittent reciprocating movement will be imparted to the arm as the cam element 69 alternately engages pins 71 and 72. Movement of arm 73 through a bell crank lever 74 imparts movement to a link 76, and in turn to a valve plate 77 to which link 76 is pivotally secured.

As best illustrated in Figure 14, valve plate 77 is slidably mounted above a cylindrical discharge chamber 78 and controls movement of coating material from a supply hopper 79 to the discharge chamber. The foregoing actuating arrangement for the valve plate 77 provides lost motion resulting in a dwell period for valve plate 77 in closed position whereby material in discharge chamber 78 may be forced therefrom by forward or discharging movement of a piston 81 operable within a cylinder 82.

The manner of operating piston 81 is best illustrated in Figures 13, 14 and 15. Shaft 64 has an eccentric arm 83 secured thereto which is provided with an eccentrically disposed pin 84 fitted within a slot 86 provided in a bar 87. Bar 87 is pivotally secured to piston 81, whereby reciprocating motion will be imparted to the piston as shaft 64 rotates. The effective length of slot 86 will determine the travel of piston 81 and the amount of material which will be drawn into discharge chamber 78 during each retractive stroke of the piston. I have provided the following adjustment arrangement, whereby the effective length of slot 86 may be altered. A threaded rod 88 provided with a hand wheel 89 is rotatably mounted on bar 87, and has a laterally extending abutment 91 threaded thereon, whereby rotation of rod 88 will move the abutment axially. The abutment projects into slot 86 and is adapted to engage pin 84. It will now be understood that by relatively moving the abutment 91 that the terminal position of piston 81 on the retractive stroke may be controlled. Also, I contemplate that the stroke of piston 81 may be altered by providing a plurality of radially disposed holes in arm 83 for receiving pin 84, and thereby altering the movement of bar 87 for each revolution of shaft 64.

As previously explained, sprocket wheel 63 is freely rotatable on shaft 64, and may be drivingly coupled to the shaft by the following clutch arrangement best illustrated in Figures 11, 12 and 15. Fixed to sprocket wheel 63 is a circular clutch element 92 having an arcuate extension 93 thereon. An arm 94 is secured to shaft 64, and pivotally supported by arm 94 is a clutch member having a part 96 adapted to engage extension 93 and an upstanding part 97 having a notch therein adapted to be engaged by a rod 98, whereby the clutch member may be rocked to a disengaged position, as illustrated in Figure 12. As illustrated in Figure 13, clutch rod 98 is conveniently accessible and retractive movement of the rod drivingly couples the mechanism for actuating valve plate 77 and piston 81 to the drive shaft 64. Also, as will be hereinafter explained, valves controlling flow of material from discharge chamber 78 are rendered operative or inoperative by movement of the clutch rod 98.

Referring to Figures 8, 13 and 14, it will be noted that bell crank lever 74 is provided with an extension 99 which is pivotally connected with a link 101. Link 101 operates a second bell crank lever 102, whereby rocking movement will be imparted to a rod 103 which, in turn, rocks an arm 104 fixed to a shaft 106. Shaft 106 projects through a valve casing 107 and internally of the valve casing an arm 108 is fixed to shaft 106. Arm 108 operates a vertically extending valve rod 109 having a circular valve disk 111 secured to the lower end thereof. A second shaft 112 also projects through the valve casing and shafts 106 and 112 are interconnected by gears (not shown), whereby both valve disks will be operated in unison. Valve casing 107 is of generally inverted U-form and is preferably detachably secured to the discharge chamber 78, whereby different valve casings may be employed. Although I have illustrated two valves, it is understood that any desired number, such as one, three or four valves, may be used, and operated in a similar manner from the rock shaft 106.

The above described mechanism is so designed that after material flows into discharge chamber 78, the valve plate 77 will shut off communication with the supply hopper 79, and the valve plate will remain in closed position during the discharge stroke of the piston. Valve disks 111 will open during the discharge stroke of the piston and a predetermined amount of coating material, such as icing or the like, will be discharged. At the same time, articles will be disposed directly beneath valve disks 111 and conveyor movement will be interrupted while the coating material is being discharged. The coating material will initially be discharged in generally cylindrical form, and as the valve disks move upwardly to closing position, the material tends to assume a conical form, thus insuring that substantially the entire area of an article desired to be coated is covered with material.

In order to insure that the articles to be coated, such as round sandwiches, are maintained in contact with guide pockets 27, I provide strips of flexible material 113, as best illustrated in Figures 1 and 16, which encircle the conveyor 14 centrally of the guide pockets 27. At each end of the conveyor, rollers are provided, as indicated at 114 and 115, over which the strips 113 pass. The rollers 115 disposed at the discharge end of the apparatus are adjustable, whereby the coated articles may be directly discharged to a wrapping table or wrapping machine. Also, by adjusting the rolls 115, a desired tension can be applied to strips 113. The strips 113 are moved through frictional contact with the conveyor slats, but the tension of the strips is so adjusted that a slight slip occurs as the slats move forward, and thus articles supported on the strips are moved rearwardly to maintain the articles in contact with the guide pockets 27, thereby insuring that the articles will be accurately positioned when disposed beneath the depositing machine 16.

Referring now to Figures 2, 4, 8, 9 and 10, I have illustrated mechanism for substantially evenly splitting a unitarily formed two-layer article, such as a round sandwich. Shaft 32 has a band wheel 116 secured thereto and a second band wheel 117 transversely aligned therewith is rotatably supported at the opposite side of the apparatus. A continuous band knife 118 is mounted on wheels 116 and 117, whereby the knife will travel along a horizontally transverse path above the conveyor, as indicated at 119. Suitable scraping and cleaning means are provided for removing material from the knife after a cutting operation, and liquid, such as water, may also be supplied to assist in the cleaning operation. In order to insure that the sandwiches and the like will be maintained in proper contact with the conveyor while being split, I dispose a pair of rolls 121 above the knife path, the rolls being freely movable vertically to accommodate articles of varying thickness and the weight of the rolls insuring that the articles will be maintained in firm contact with the conveyor.

In order to split articles of different thickness substantially equally, I provide the following arrangement. The conveyor chains 23 and 24 will normally ride on longitudinally extending guide elements 122 whereby all of the slats will travel in a common horizontal plane when approaching the splitting means. If it is desired to substantially evenly split an article of less thickness than that for which the machine has been adjusted, the conveyor in the zone of the splitting means is elevated in the following manner. A bar 123 provided with spaced semicircular recesses 124 is pivotally connected to bars 125 and 126, the bars normally resting on the guide elements 122. A rock shaft 127 is rotatably mounted in the apparatus frame, and is adapted to be rocked through an angle, such as 90° by handle 128 and locked in an adjusted position. Secured to rock shaft 127 are a pair of arms 129 which pivotally connect with links 130, the links at their opposite ends engaging a shaft 131. Shaft 131 is secured by bars 132 to a second shaft 133, whereby both shafts will be moved longitudinally as the rock shaft 127 is actuated. At each end of shafts 131 and 133 rollers 134 are mounted. The rollers normally seat within recesses 124 of bars 123, whereby the slats will travel along a horizontal or non-elevated path when approaching the splitting means. In the non-elevated position, the band knife 118 will effect splitting at a given distance above the conveyor slats. When it is desired to split an article of smaller thickness, the rock shaft is rotated to the position illustrated in Figures 9 and 10, whereby rollers 134 are moved out of recesses 124 and ride along the bottom edge of bar 123, thereby causing the conveyor slats to travel an elevated path beneath the band knife, and thereby decreasing the distance from the band knife to the slats.

The operation of the apparatus will now be described, in connection with forming round sandwiches. An operator positioned at the loading or left hand end of the apparatus, as viewed in Figure 1, will place two unitarily formed double layer baked articles 136 in the guide pockets 27, in approximate position on a conveyor slat, and this operation will be repeated for each succeeding slat. As the conveyor is intermittently moved forwardly slippage of flexible strips 113 will occur, tending to carry the articles 136 rearwardly and will maintain the articles in proper contact with the guide pockets 27. The articles will be carried into contact with the band knife and split, and during this operation, the weight of the rolls 121 will maintain the articles in proper position on the conveyor. The split articles will then be carried forwardly and a second operator removes the top halves of the split articles and places these halves on the slat carrying the bottom halves, as indicated at 136a. The bottom halves 136b will then be carried beneath the depositing machine 16 and the coating will be applied, as previously described, while conveyor movement is interrupted with the articles positioned beneath the valve disks 111. After the coating is applied the second operator will then replace the top halves 136a on the coated bottom halves 136b and the completed sandwich will be carried by the strips 113 passing over the rolls 115 to an adjacent wrapping machine or wrapping table.

I have found that the apparatus described can be efficiently operated to deliver sandwiches at the rate of one hundred and twenty per minute. Of course, in coating a one-layer article it would not be necessary to employ the splitting means. The splitting means could be omitted or rendered inoperative by removing the band knife 118.

Although I have shown and described a preferred form of my invention, I contemplate that numerous and extensive departures may be made therefrom without departing from the spirit of my invention and the scope of the appended claim.

The invention is hereby claimed as follows:

Apparatus for rapidly applying a coating of viscous material to articles positioned beneath said apparatus and comprising a hopper, a discharge chamber below the hopper, a valve for intermittently closing communication between the hopper and chamber, means for intermittently opening and closing the valve between the hopper and the chamber, said chamber having a discharge opening, plunger means for sucking material into the chamber when the valve is open and for forcing the material through the discharge opening when the valve between the hopper and chamber is closed, a valve disk at the outer end of the discharge opening movable away from the chamber opening to open and toward the opening to close said opening, means for operating the plunger on its suction stroke when the first valve is open and the second valve is closed, said means operating the plunger on its pressure stroke when the valve disk is lowered and the first valve is closed, and means for operating the valve disk to open the disk on the pressure stroke of the piston and to move the disk upwardly to closed position on the completion of the discharge stroke whereby the coating will be formed into a cone on the article on which it is deposited.

JOHN R. LITTY.